United States Patent [19]

Finley et al.

[11] Patent Number: 5,035,368

[45] Date of Patent: Jul. 30, 1991

[54] GYRATORY CRUSHER

[75] Inventors: David A. J. Finley, Craigie; Peter M. Carley, Myaree; James R. Stokes, Thornlie; Robert C. Napier, Gosnells, all of Australia

[73] Assignee: Yalata Pty Ltd, West Perth, Australia

[21] Appl. No.: 459,759

[22] PCT Filed: Jun. 30, 1988

[86] PCT No.: PCT/AU88/00228

§ 371 Date: Feb. 9, 1990

§ 102(e) Date: Feb. 9, 1990

[87] PCT Pub. No.: WO89/00455

PCT Pub. Date: Jan. 26, 1989

[30] Foreign Application Priority Data

Jul. 9, 1987 [AU] Australia ............................... PI3021

[51] Int. Cl.[5] ................................................ B02C 2/00

[52] U.S. Cl. .................................................... 241/212

[58] Field of Search ................................ 241/207-216, 241/264

[56] References Cited

U.S. PATENT DOCUMENTS

| | | | |
|---|---|---|---|
| 229,387 | 6/1880 | Davis | 241/212 |
| 997,918 | 7/1911 | Jones | 241/212 |
| 1,344,584 | 6/1920 | Gibson | 241/212 X |
| 3,109,600 | 11/1963 | Nyberg | 241/212 X |

FOREIGN PATENT DOCUMENTS

| | | |
|---|---|---|
| 827158 | 4/1981 | U.S.S.R. . |
| 874170 | 10/1981 | U.S.S.R. . |

OTHER PUBLICATIONS

Mechanical Engineering Handbook, Berlin, 1971, Sections 2.2, 2.2.2.2, Gyratory Crushers (with translation).

Engineering Journal, Aug. 23, 1878, "Motte's Stone Crusher".

Engineering & Mining Journal, vol. 124, No. 4 (no date), c. 1920.

*Primary Examiner*—Mark Rosenbaum
*Attorney, Agent, or Firm*—Ralph F. Crandell

[57] ABSTRACT

An apparatus for crushing frangible or friable material using a gyratory action. The crushing apparatus includes a bowl (13) having a chamber (15) for receiving material to be crushed. The chamber (15) has a central discharge opening (27) disposed at the base thereof. The discharge opening (27) defining a throat (38) having a circumferential wall (39). A pivotable crushing head (17) is disposed generally centrally within the discharge opening (27) in spaced relation to the wall of the throat (38) to define an annular nip (41) between the wall of the throat and the outer surface (37) of the head. The crushing head is centrally supported about a pivot point (B) to permit rotational and oscillatory motion of the crushing head about the pivot point. A means including a spindle (43) is provided for imparting oscillatory motion to the crushing head. The arrangement is such that material deposited into the bowl is subjected to crushing by the motion of the crushing head relative to said wall with opposite sides of the crushing head co-operating with the wall of the throat to maintain the gap of said nip during an entire oscillation of the crushing head.

19 Claims, 3 Drawing Sheets

GYRATORY CRUSHER

BACKGROUND OF THE INVENTION

1. Field of the Invention

This invention relates to crushing apparatus for frangible or friable material and more particularly to crushing apparatus of the gyratory type.

2. Description of the Prior Art

Existing types of primary, secondary and tertiary crushers for reducing the size of frangible or friable solids include gyratory crushers. A typical gyratory crusher consists of an inner truncated cone which revolves about a central vertical axis of an outer conical chamber to define a tapered annular space between the chamber and the cone. The inner cone has a circular movement about the vertical axis of the chamber but does not generally rotate about its own axis of symmetry.

The movement is given to the inner cone by a cam arrangement driven from beneath the cone by an external motor and gear train. The gear train rotates a large eccentric assembly comprising the cam arrangement which causes the shaft on which the cone is mounted to revolve about the vertical axis of the chamber whereby the point of intersection between the vertical axis and the gyratory axis is above the inner cone. Consequently, gyration is almost entirely horizontal resulting in the size of the annular space between the inner cone and outer chamber being relatively small at one side of the inner cone and relatively large at the opposite side of the cone during gyration. This large variation in the gap of the annular space results in a relatively large variation in the size of material discharged from the crusher. Consequently, when a particular material size is required, it is usually necessary for up to 40% of the discharged material to be re-crushed in order to reduce the same to a satisfactory size. Such inefficiency results in the crusher being subject to prolonged use and consequently increases the propensity of the crusher to wear and breakdown.

Additionally, the components of the crusher used for driving the inner cone in a gyratory manner from below the crushing assembly are required to be of a complex and precise design which makes the replacement of such components a very expensive task not only in terms of component costs but also in down time by requiring specialised maintenance or repair personnel to attend to such matters.

OBJECTS AND SUMMARY OF THE INVENTION

It is an object of the present invention to provide an improved gyratory crusher embodying a different type of crushing action than adopted in previous designs of gyratory crushers to crush frangible or friable material so as to achieve improved crushing efficiency and reduced expense in the repair and maintenance of the crushing apparatus used to generate this crushing action.

In accordance with one aspect of the present invention, there is provided a crushing apparatus for frangible or friable material comprising:

A bowl having a chamber for receiving said material and a central discharge opening disposed at the base thereof, said discharge opening defining a throat having a circumferential wall; a crushing head disposed generally centrally within said discharge opening having a crushing face in spaced relation to said wall of said throat defining an annular nip between said wall and the crushing face of said head, said crushing head having a gyratory axis; and a drive assembly for driving said crushing head within said bowl; wherein said crushing head is supported by a support assembly at an offset position relative to the central axis of said bowl about a fixed pivot point at the intersection of said gyratory and central axes to permit rotational and oscillatory motion of said head about said point; said fixed pivot point being located proximate to, or coincident with, the bottom of said crushing head such that oscillation of the top of said crushing face is caused to be predominantly in a direction generally transverse to said central axis and oscillation of the bottom of said crushing face is caused to be predominantly in a direction parallel to said central axis.

Preferably, said rotational and oscillatory motion imparting means comprises a rotatable shaft disposed centrally within said chamber for rotation about a central axis, said shaft having an axial end disposed within said chamber for engaging said head in such a manner so as to dispose said head at a fixed angular position offset to the central axis of said shaft whilst permitting relative rotation between said head and said shaft.

Preferably, said fixed angular position is maintained by a locating pivot pin or journal extending between said head and shaft, said pin or journal being coincident with the gyratory axis of said head, and permitting relative rotational movement between said shaft and head, thereabout.

DESCRIPTION OF THE PREFERRED EMBODIMENTS

Figure 1:
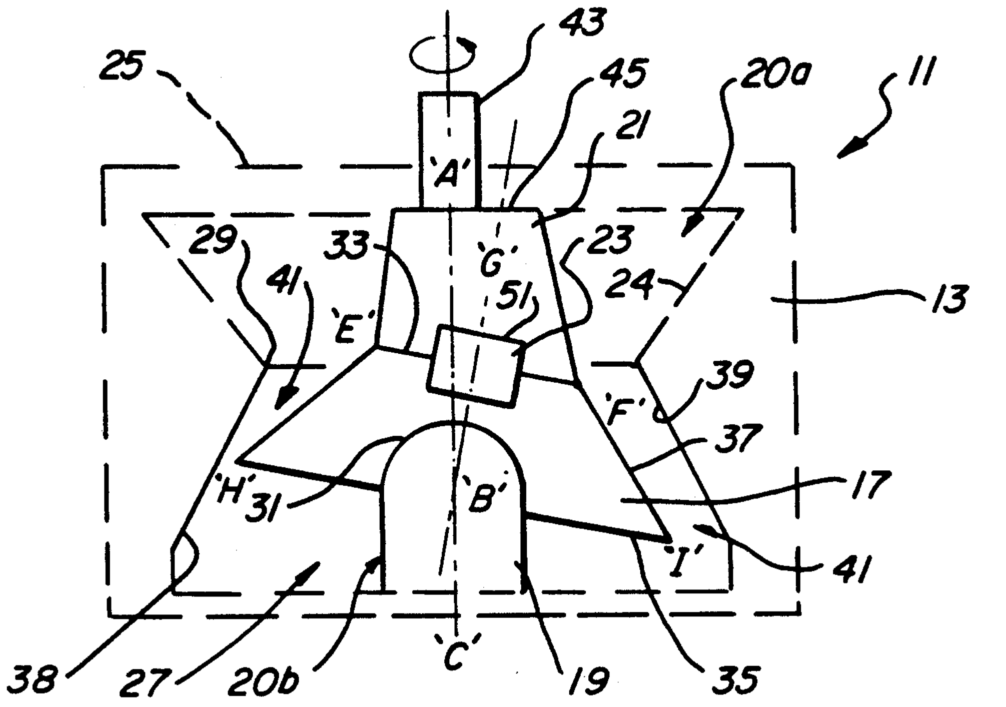
FIG. 1 is a schematic side elevation of the crusher indicating the principle by which gyration is obtained.
Figure 2:
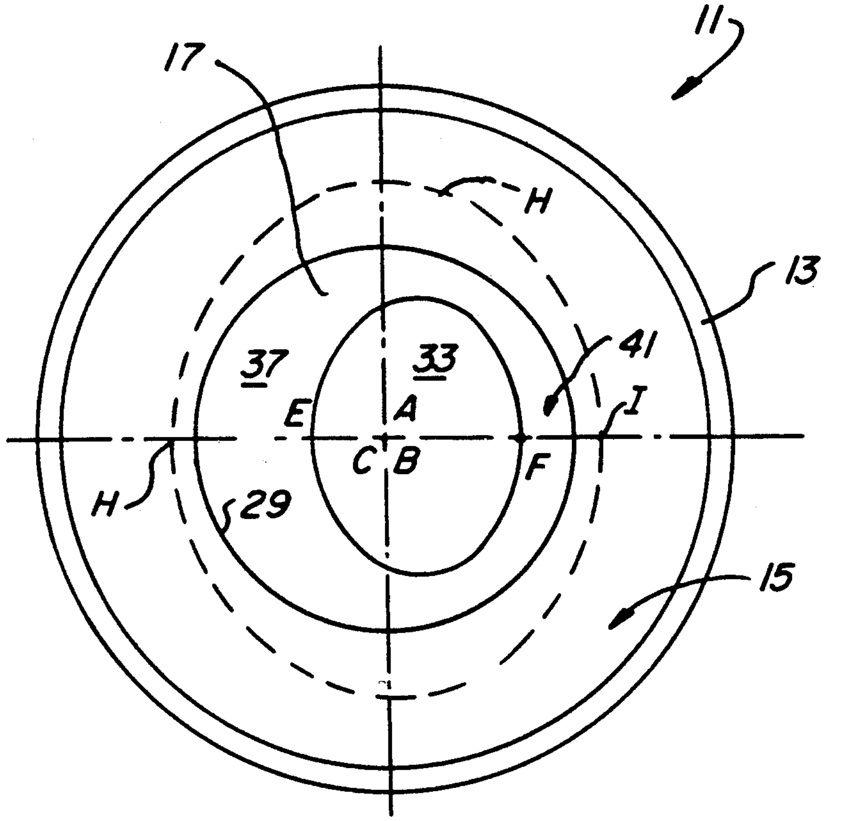
FIG. 2 is a plan view of FIG. 1 in the region of the crushing head.

Both embodiments are directed towards a crushing means in the form of a gyratory crusher for frangible or friable material. It should be noted that the drawings, particularly FIG. 1, depict a crushing head having an exaggerated gyratory angle for the purposes of illustration. In practice, the gyratory angle may be much more acute than that shown, conversely this specification does not exclude the gyratory angle being more obtuse.

As shown at FIG. 1 of the drawings, conceptually, the gyratory crusher 11 comprises a bowl 13, a crushing head 17, a drive assembly and a support assembly (20*a*, 20*b*) disposed at opposite ends of the head. Moreover the support assembly generally comprises a knuckle 19 disposed near the base of the bowl 13, a shaft 21 disposed above the crushing head 17 and a pivot pin 23, interposed between the shaft 21 and crushing head 17.

The bowl 13 has an inner conical chamber 15 provided with an upper circular mouth 25 through which material may be deposited into the chamber 15 for crushing between a wall 37 on the head and a wall 39 on the bowl, and a lower discharge opening 27 through which crushed material is discharged from the crusher. The discharge opening 27 defines a throat 38 having a circumferential substantially conical wall 39 within which the crushing head 17 is disposed. The chamber 15 is generally symmetrical about a central axis AC, and may be also formed with a circumferential conical wall 24 of opposite taper to the wall 39 of the throat. Accordingly the wall 24 converges inwardly from the mouth 25 towards the discharge opening of the bowl to adjoin the throat contiguously. The circumferential wall 39 in general, subsequently diverges outwardly from the chamber 15 to the base of the bowl 13. Consequently, the convergence of wall 24 and wall 39 may define a circular constriction 29 within the bowl at their junction although certain forms or shapes of bowl may not necessarily define any clear point of constriction.

The knuckle 19 is fixedly disposed centrally within the discharge opening 27 of the bowl and is generally provided with a hemispherical face 31 usually facing the chamber 15. The hemispherical face 31 provides a seat upon which the crushing head 17 may sit to define a universally pivotable joint so that the head can pivot, rotate oscillate, or nutate upon the knuckle about a pivot point B coincident with the central axis AC of the chamber 15 and lying in the plane of the bottom peripheral edge of the crushing head 17.

In this specification, the term "gyratory axis" is defined to mean the axis about which the crushing head of the crushing apparatus is symmetrical, and the term "gyratory angle" is defined to mean the angle between the "central axis" of the bowl and the "gyratory axis."

The crushing head 17 is generally of frusto-conical shape having an upper circular planar face 33 of lesser diameter than the diameter of the circular constriction 29, a lower circular planar face 35 parallel to the upper face 33 and of greater diameter than the diameter of the constriction 29, and a conical crushing face 37, extending between the peripheries of the upper and lower faces 33 and 35 respectively. The lower face 35 of the head 17 defines the plane in which the gyratory pivot point B is located and is centrally dished to provide a bearing surface to sit upon the hemispherical face 31 of the knuckle 19 and permit universal pivotal and rotational movement of the head about the pivot point B.

The knuckle 19 and head 17 are each precisely configured so that the head may be seated in the region of the discharge opening 27 so that the crushing face 37 thereof is positioned adjacent to, but spaced from, the circumferential wall 39 of the throat 38 to extend below the constriction 29 and so define an annular nip 41 between the wall 39 and conical crushing face 37 of the head. Consequently the diameter of the lower face 35 of the head 17 is less than the maximal diameter of the discharge opening 27 so that the size of the gap between the conical crushing face 37 and wall 39 can be adjusted by axially moving the bowl relative to the knuckle and head or moving the knuckle and head axially relative to the bowl.

In the concept, the upper planar face 33 of the head is formed with a circular recess 49 having a central axis disposed orthogonally to the plane of the face and being coincident with the gyratory axis of the head. The recess 49 is provided to accommodate one end of the pivot pin 23 which interconnects the head 17 and shaft 21.

The shaft 21 is operatively connected to a spindle 43 of the drive assembly (not shown) disposed near the top of the bowl, for rotation of the shaft about the central axis AC of the chamber 15. The outer axial end 47 has an end face disposed in an oblique plane to the right section of the shaft.

In the first embodiment, the outer axial end 47 of the shaft, like the head 17, is also provided with a circular recess 51 in its end face, having a central axis disposed orthogonally to the plane of the end face and being offset a prescribed distance from the central axis AC of the shaft. The recess 51 is provided to accommodate the other end of the pivot pin 23 so that the shaft and head are interconnected by virtue of the pivot pin 23

The pivot pin 23 is of a right circular cylindrical shape whereby the opposing halves of the pin form outwardly projecting bearing portions rotatably receivable within the respective recesses 49 and 51 of the head and shaft to tix the head 17 at a prescribed angular disposition relative to the central axis AC whilst permitting relative rotational movement between the head and shaft and revolution of the head about the central axis AC of the crushing chamber 15. Consequently, the central axes of the recesses 49 and 51 and pivot pin 23 are coincident with the gyratory axis GB of the head 17.

The axial extent of the pivot pin 23 may be marginally longer than the combined depth of the recesses 49 and 51 to space the end face 47 and upper face 33 apart, so that the only bearing surfaces between the shaft and head occur at the pivot pin. A dust seal (not shown) is provided between the end face 47 and the upper face 33 to seal the pin and recesses from exposure to material being crushed within the bowl. In other embodiments not shown, the faces 47 and 33 may be kept apart by other methods such as by the opposing ends of the inner and outer races of a taper roller bearing.

In operation, the spindle 43 of the drive assembly is typically directly driven by a hydraulic motor (not shown) which causes the shaft 21 to rotate about the central axis AC of the crushing chamber. As the shaft rotates, the crushing head 17 will be caused to rotate at its prescribed angular disposition about the central axis AC by pivoting about the pivot point B of the knuckle 19 while generally being free to rotate in any direction relative to the bowl and shaft around is gyratory axis GB. By having the pivot point B located proximate to, or coincident with the bottom surface of the crushing head and by virtue of the relative spacial relationship and configuration of the constriction 29, wall 39 of the throat and conical face 37 of the head, the gap of the nip 41 typically varies only marginally about the lower periphery IH of the bottom of the crushing face 37 of the head throughout an entire revolution of the shaft 43, whereas the upper periphery EF of the top of the crushing face 37 of the head typically provides a relatively large degree of change in gap size proximate the constriction 29 of the bowl during this revolution of the shaft.

In the absence of any resistive force being applied to the head during revolution of the same about the central axis AC, the head may rotate relative to the bowl and to the shaft. However, when frangible or friable material is deposited into the chamber 15 through the mouth 25, and is received within the confines of the annular nip 41, the material will tend to resist rotation of the head relative to the bowl. Consequently, the shaft 21 will continue rotating about the central axis AC, and the crushing head will effectively oscillate or nutate about the pivot point B. During this oscillation or nutation of the head, the head itself will rotate about its gyratory axis GB. The period of a revolution of the head about the gyratory axis GB is approximately the same as the period of a revolution of the gyratory axis about the central axis AC, however, slight variations may occur as a result of the frictional effect of the material being crushed between the crushing wall and face. This may result in a slight circular inching of a point on the lower periphery IH of the head with respect to an adjacent point on the circumferential wall 39 of the discharge opening in a clockwise or anti-clockwise direction during oscillation or nutation of the head.

Thus, when material is trapped within the nip 41, the material applies a retarding force upon the rotation of the head 17 which ensures relative rotation between the shaft 21 and the head. This consequently ensures rotation of the head about the gyratory axis GB thereof and thus nutational or oscillatory motion about the pivot point B of the knuckle. Consequently, the nutational or oscillatory motion created in the head results in a point on the surface of the head oscillating along an arcuate path having a vertical component and transverse component of movement with respect to the central axis AC of the crusher. It should be noted that this nutational motion is only achieved when the pivot point B is located proximate to, or coincident with, the bottom of the crushing head, the bottom of the crushing head being defined to be the plane coincident with the bottom periphery of the crushing face. At this position, oscillation of the top of the crushing face 37 is caused to be predominantly in a direction generally transverse to the central axis AC (i.e. horizontal), and oscillation of the bottom of the crushing face 37 is caused to be predominantly in a direction parallel to the central axis AC (i.e. vertical).

Thus, a crushing motion is always applied to material received within the nip 41 by a combination of transverse and vertical oscillations of the crushing head. This type of crushing action provides a much more effective distribution of force upon material trapped within the nip which reduces the tendency for the head to impact the material during oscillation or nutation thereof and promote the use of pressing forces to continually press the material between opposing sides of the nip once contact is made.

Although not clearly shown in the drawings, this principle of nutating or oscillation of the head about the pivot point B results not only in different parts of the surface of the crushing head alternately defining minimum and maximum gaps of the nip during a revolution of the head, but corresponding minimum gaps of the bottom and top of the crushing face being disposed diagonally opposite to each other on opposing sides of the head at any one time, and similarly with corresponding maximum gaps, the maximum and minimum gaps of the top and the bottom of the crushing face being 180° out of phase with respect to each other. For example, when the head is titled to one side, as shown at FIG. 1 of the drawings, the points F and H of the surface of the head co-operate with the circumferential wall 39 to respectively define minimum gaps of the nip for the top and bottom of the crushing face 37, concurrently with opposing points E and I defining respective maximum gaps of the nip for the top and bottom of the crushing face.

It should also be noted that as one portion of the nip has its gap changed from a minimum to a maxiumum size at either the top or bottom of the head then the converse situation is occurring at the opposite portion of the nip so that there is always a partial progression of material down through the nip around its entire circumference as opposed to a total falling through of material through the nip after it has reached a minimum gap size. For example, if the top of one side of the head defined the maximum gap for the top of the crushing face at a particular point in time, then the bottom of that one side of the head would define the minimum gap for the bottom of the crushing face and material would occupy substantially a V-shaped recess. As the head further revolved by 180° however, the V-shape would progressively become inverted whereby the top of one side of the head would now define the minimum gap for the top of the crushing face and the bottom of the one side of the head would now define the maximum gap for the bottom of the crushing face. Consequently, the material that was previously disposed within the maximum gap would progressively be crushed, whereas material disposed in the region of the minimum gap would progressively be released from crushing pressure and allowed to fall out through the lower discharge opening. In this manner, material progresses through the nip after a plurality of oscillations. Thus, a more efficient crushing operation providing a greater volume of usable crushed product is achieved than with previous types of crusher designs.

An important advantage of the present embodiment is that by maintaining a minimum and maximum gap at any point around the circumference of the nip at the top and bottom of the surface of the crushing head and vice versa during progressive revolutions of the head, the variation in size of crushed material permitted to pass through the discharge opening 27 from the confines of the nip 41, is small, thus allowing the size of material to be set accurately thereby obviating or substantially reducing the need for re-crushing of material which has not been sufficiently reduced in size. Adjustment of gap size can easily be provided by simply elevating or lowering the knuckle 19 axially within the bowl or conversely the bowl relative to the knuckle. Similarly adjustment of the gap size to compensate for wear on the crushing surface 37 of the head or wear on the hemispherical surface 31 can be performed in the same manner.

Figure 3:
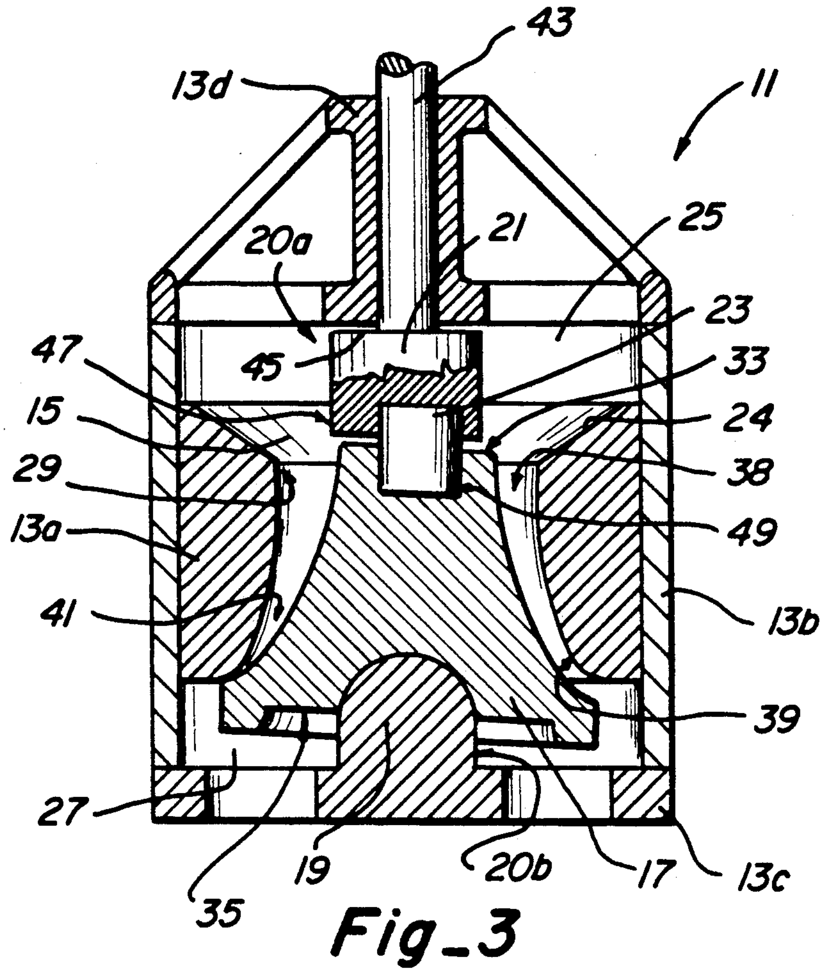
FIG. 3 is a sectional elevation of the first embodiment of the crusher.

The first embodiment of the gyratory crusher is shown at FIG. 3 of the drawings and is closely based upon the conceptual description of the crusher. Accordingly, the same reference numerals used in the conceptual description of the crusher have been used in the drawing to identify corresponding parts.

The first embodiment departs from the conceptual description in only minor respects.

The bowl 13 is of segmented form which comprises an inner portion 13_a_ adjustably mounted within an outer frame portion 13_b_ with a base 13_c_ and an upper portion 13_d_ which extends over the mouth 25 to provide a large bearing support for accommodating the shaft 21. An anti-tramping mechanism (not shown) may be of conventional design to enable infrangible material to pass through the annular nip 41 without damaging the respective crushing faces of the head 17 and throat 38.

Figure 4:
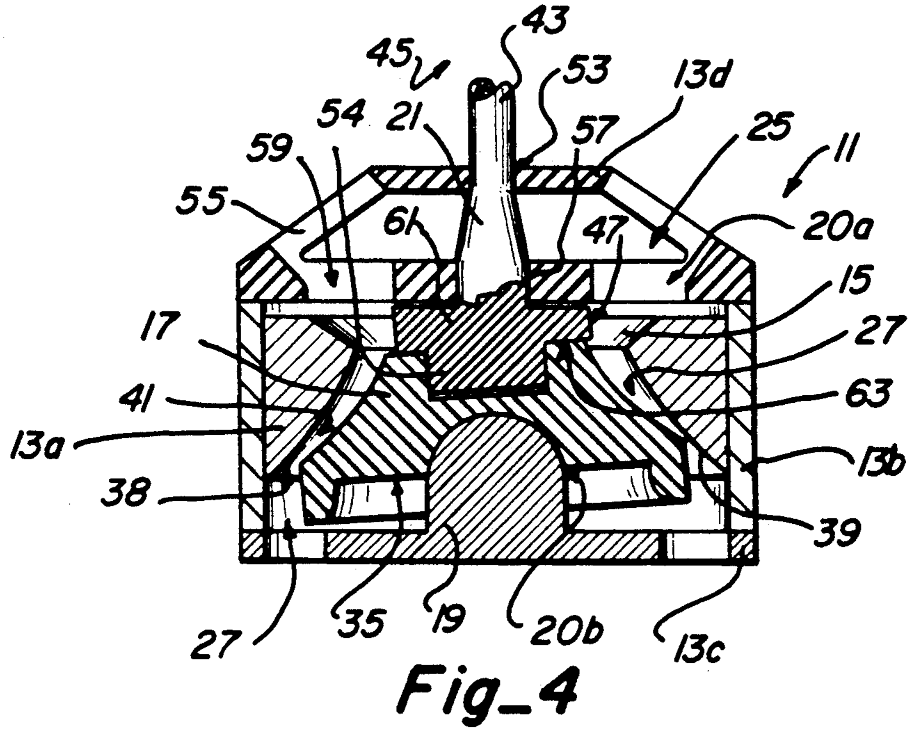
FIG. 4 is a sectional elevation of the second embodiment of the crusher.
Figure 5:
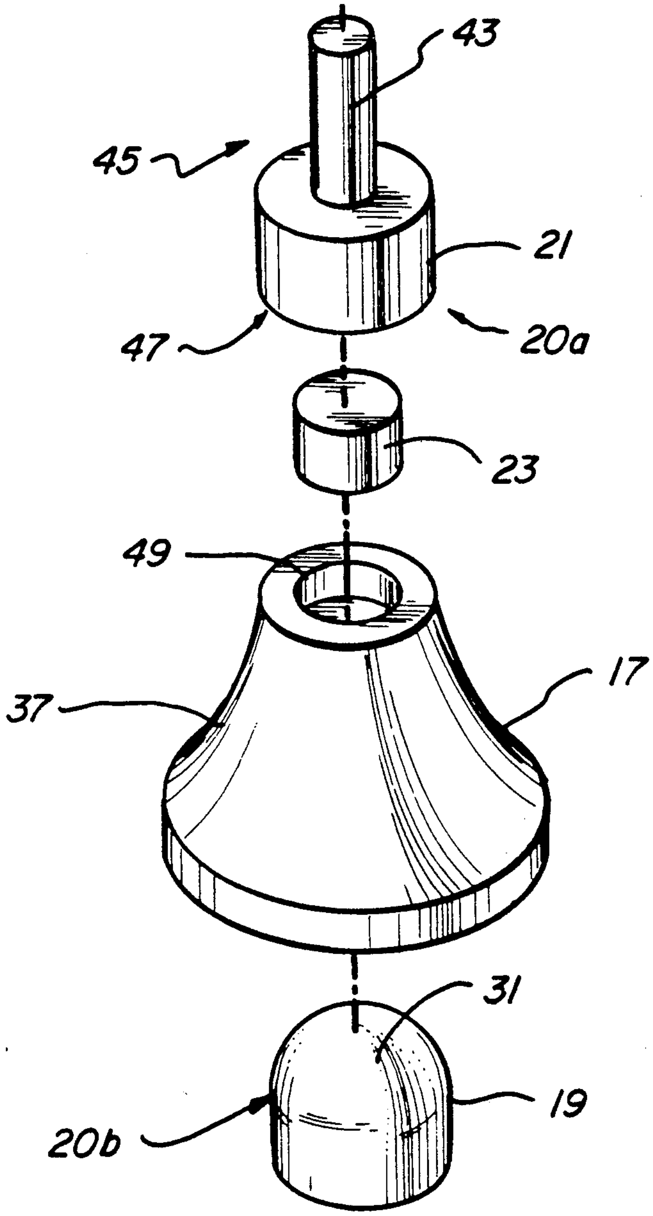
FIG. 5 is an exploded view of the shaft, pivot pin, head and knuckle of the first embodiment.

The second embodiment of the gyratory crusher is shown at FIG. 4 of the drawings and is of a marginally different design than the previous embodiment, although still embodying the conceptual description of the crusher. Accordingly, the same reference numerals have been used in the drawing to identify corresponding parts of the crusher which were previously described in the conceptual description.

The second embodiment departs from the preceding embodiment in that the upper frame **13*d* extends over the mouth 25 of the crushing chamber to provide a double bearing support for accommodating the shaft 21. Consequently, the shaft 21 may be of a different design than that described in the preceding embodiment whereby the spindle 43 may be of a greater longitudinal extent to provide an outer journal 53 accommodated within an outer diametrally extending portion 55 of the frame 13*d* and an inner journal 57 accommodated within an inner diametrally extending portion 59 of the frame. The spindle 43 is symmetrically tapered from its one axial end 45 to the axial end 47 within the bowl. The axial end 47 is formed with an end 61 which has an outer planar face obliquely disposed to the central axis of the chamber in a similar disposition to the outer face 33 of the shaft in the preceding embodiment. The outer face 63, however, instead of being provided with a circular recess 51 accommodating a pivot pin is integrally formed with a locating journal 54 so that the journal 54 extends outwardly at the required disposition offset from the central axis of the shaft. As in the preceding embodiment, the journal 54 is rotatably receivable within a recess 49 provided in the upper circular planar face 33** of the crushing head. Accordingly, the shaft imposes the required disposition to the crushing head as in the preceding embodiment to achieve rotational and nutational or oscillatory motion during rotation of the shaft.

In a further embodiment the journal 54 may be integrally formed with the head 17 and be rotatably receivable within a recess 31 provided in the outer planar face 63 of the shaft.

In a modification to the previous embodiments, the crushing head 17 may be provided with any form or shape of crushing face 37 such as an arcuate concave or convex crushing face, instead of a frusto-conical surface.

Accordingly, the shape of the circumferential wall 39 may be generally of such shape as to provide a reducing gap between the crushing faces 37 of the head and 39 of the bowl from the constriction 29 to the discharge 27 of the crusher.

In a further embodiment to the previous embodiments the position of the point B may be at a higher or lower position relative to the head 17 than is pictorially demonstrated.

In a further embodiment to the previous embodiments a thrust bearing may be provided between the upper face 33 of the head and the lower face 47 of the shaft.

By adopting the present invention, many advantages are provided over previous gyratory crushers. These include:

1. The cost of manufacture is substantially less than that of existing crushers due to the simplicity of design and reduction in number of component parts. For example in conventional designs there may be 30 or more principal components whereas in a typical embodiment of the present invention there would be approximately 8 principal components.

2. Previous designs usually employ 14 or more principal moving parts, whereas in a typical embodiment of the present invention there are 3 principal moving parts.

3. Due to the simplicity of design there is a large reduction in the number of spare parts required to be maintained on site and also frequency of maintenance is not as great.

4. Relatively simple hydraulic drives may be employed in the present invention as opposed to the use of external electric motors and gearboxes for previous designs.

5. Lubrication is a simple matter in the present invention due to the simplicity of components whereas this is a complex matter for previous designs.

6. Time spent on maintenance is significantly reduced due to the descreased number of component parts than is the case for previous designs.

7. Due to the superior mechanism employed in the present invention, the power input required to drive the crusher may be significantly less than that required for previous designs where efficiencies in the order of 65% may only be obtained.

8. The efficiency of operation of the present invention can approach 100% in terms of the low quantity of material required to be re-crushed as opposed to previous designs where efficiencies in the order of only 60% are usually obtained.

9. The crushed particle size that can be obtained by using the present invention can be much smaller than 1/16th of an inch with virtually no re-crushing required as opposed to conventional designs which typically have difficulties obtaining 3/16 of an inch (with 40% or more of the product requiring recrushing).

10. The operating mechanism presents low centrifugal imbalance (and even none, depending on the outer design of the shaft) when compared with present crusher designs. Consequently, wear, power loss and imbalance is reduced to a minimum thus providing the ability to produce crushers of a greater size than was previously the case.

11. Due to the simplicity and small number of components employed, crushers can be produced small enough to be transported in conventional vehicles for personal or low volume applications. Conventional portable crushing plants are both expensive and of such a size as to require heavy transport.

It should be appreciated that the scope of the present invention is not limited to the particular embodiment herein described. In particular, the present invention is not limited to application with ore crushing or use in the mining industry but may have utility in other areas since the crushing action as employed in the present invention is not limited by component size.

We claim:

1. Apparatus for crushing frangible and friable material comprising, in combination, a bowl having an inner circumferential wall defining a chamber for receiving said material, said chamber having a central axis and terminating in a throat defining a central discharge opening, a crushing head disposed generally centrally within said chamber and rotatable about a gyratory axis, said head having a crushing face in spaced relation to said inner circumferential wall, said head and body defining an annular nip between said wall and said crushing face, a support assembly supporting said crushing head with its gyratory axis positioned at an acute angle relative to the central axis of said bowl for gyration about a fixed pivot point defined at the intersection of said gyratory and central axes to permit rotational and oscillatory motion of said head about gyratory axis and said point respectively, said pivot point being located substantially in the plane of the bottom of said crushing head, and a drive assembly for driving said crushing head with a gyratory movement within said bowl chamber.

2. Crushing apparatus as defined in claim 1, wherein said support assembly comprises a rotatable shaft disposed centrally within said chamber for rotation about said central axis, said shaft having one axial end disposed within said chamber for rotatably engaging said head and the other axial end extending from said chamber for connection to said drive assembly, said one axial end being arranged so as to dispose said head at a fixed angular position relative to said central axis and means journaling said one axial end to said head whereby relative rotation between said head and said shaft can occur during rotation of said shaft.

3. Crushing apparatus as defined in claim 2, wherein said journaling means comprises a locating journal pin interposed between said head and said shaft, said journal pin having a central axis coincident with the gyratory axis of said head for providing for relative rotational movement between said shaft and head about said gyratory axis.

4. Crushing apparatus as defined in claim 3, wherein the angular position of said journal pin is fixed by engagement of one axial end of said pin with said one axial end of said shaft at a position offset and obliquely disposed to said central axis such that the central axis of said pin is at said fixed angular position, and the other axial end of said pin engages said leading axial end of said head at a position coincident with the gyratory axis of said head, the central axis of said pin being coaxially aligned with said gyratory axis.

5. Crushing apparatus as defined in claim 4, wherein said journal pin is of a circular cylindrical shape and the opposing axial portions of said pin form outwardly projecting journal bearing portions, and said respective axial ends of said shaft and head are each provided with recesses at required locations to receive said bearing portions and cause said head and pin to adopt said fixed angular position.

6. Crushing apparatus as defined in claim 5, wherein the axial extent of said pin is marginally longer than the combined depth of said recesses therein to maintain the respective axial ends of said shaft and head in spaced apart relation.

7. Crushing apparatus as defined in claim 6, wherein a seal is disposed between the spaced apart axial ends of said shaft and head to seal at least one of said pin and journal and said recess from material in the chamber of said bowl.

8. Crushing apparatus as defined in claim 3, wherein said journal pin is integral with at least one of said axial end of said shaft and the leading axial end of said head.

9. Crushing apparatus as defined in claim 8, wherein said journal pin is of a circular cylindrical shape.

10. Crushing apparatus as defined in claim 9, wherein the axial extent of said journal pin is marginally longer than the depth of said recess, to space the respective axial ends of said shaft and head apart.

11. Crushing apparatus as defined in claim 10, wherein a seal is disposed between the spaced apart axial ends of said shaft and head to seal at least one of said pin and journal and said recess from material in the chamber of said bowl.

12. Crushing apparatus as defined in claim 8, wherein said journal pin is of a circular cylindrical shape and is journaled in a recess in at least one of said axial end of said shaft and leading axial end of said head adapted to receive said journal pin whereby said head is positioned in said fixed angular position.

13. Crushing apparatus as defined in claim 1, wherein said crushing head is supported relative to said bowl by a universally pivotable joint allowing free rotational and nutational motion of said head about said pivot point, said joint comprising a pair of mating components one component being disposed centrally within said discharge opening at the base of said bowl and the other component being disposed on the trailing axial end of said head.

14. Crushing apparatus as defined in claim 13, wherein said one component comprises a knuckle fixedly disposed at said base and said other component comprises a centrally dished region provided on the trailing axial end of said head, said knuckle having a hemispherical face facing said chamber and said dished region having a bearing surface of complementary hemispherical shape to said knuckle to accommodate said knuckle, whereby said knuckle forms a seat on which said head may freely rotate and nutate.

15. Crushing apparatus as defined in claim 14 wherein said one component is axially adjustable in position relative to said bowl to enable adjustment of the gap of said annular nip.

16. Crushing apparatus as defined in claim 1 wherein said one component is axially adjustable in position relative to said bowl to enable adjustment of the gap of said annular nip.

17. Crushing apparatus according to claim 1 wherein said crushing head is of substantially right frusto-conical shape having the leading and trailing axial ends of said head defining circular parallel faces, and a circumferential tapered face extending therebetween, said leading end face being generally of a smaller diameter than said trailing end face such that said tapered face combines with the wall of said throat to define said annular nip.

18. Crushing apparatus according to claim 17, wherein said circumferential face includes an externally concave portion extending from said leading axial end towards said trailing axial end with increasing curvature and a cylindrical portion of substantially constant diameter extending from the junction with said concave portion proximate to said trailing axial end, to said trailing axial end.

19. Crushing apparatus according to claim 1 wherein said chamber is provided with a mouth through which material is deposited and a circumferential wall which converges inwardly from said mouth towards said discharge opening to adjoin said throat contiguously, and the circumferential wall of said throat generally diverges outwardly from the chamber towards the base of said bowl, whereby said chamber and said discharged opening define a circular constriction at their junction.

* * * * *